United States Patent [19]
Bolas et al.

[11] Patent Number: 5,436,638
[45] Date of Patent: Jul. 25, 1995

[54] IMAGE DISPLAY METHOD AND APPARATUS WITH MEANS FOR YOKING VIEWPOINT ORIENTING MUSCLES OF A USER

[75] Inventors: Mark Bolas; Ian E. McDowall, both of Palo Alto; Russell Mead, Los Altos Hills, all of Calif.

[73] Assignee: Fakespace, Inc., Menlo Park, Calif.

[21] Appl. No.: 169,164

[22] Filed: Dec. 17, 1993

[51] Int. Cl.6 .............................................. G09G 3/02
[52] U.S. Cl. .................................. 345/156; 273/148 B
[58] Field of Search .............. 273/148 B, 148 R, 438; 434/43, 69, 307; 128/774, 779, 781, 782; 345/161, 184, 156, 157, 158; 364/425

[56] References Cited

U.S. PATENT DOCUMENTS

| | | | |
|---|---|---|---|
| 3,434,342 | 3/1969 | Kazmarek | 273/148 B |
| 4,048,653 | 9/1977 | Spooner | 345/156 |
| 4,315,240 | 2/1982 | Spooner | 340/27 |
| 4,315,241 | 2/1982 | Spooner | 340/27 |
| 4,340,878 | 7/1982 | Spooner | 340/27 |
| 4,347,508 | 8/1982 | Spooner | 340/705 |
| 4,349,815 | 9/1982 | Spooner | 340/705 |
| 4,800,897 | 1/1989 | Nilsson | 128/782 |
| 4,820,162 | 4/1989 | Ross | 345/161 |
| 4,895,376 | 1/1990 | Chiang Shiung-Fei | 273/85 G |
| 4,988,981 | 1/1991 | Zimmerman et al. | 340/709 |
| 5,035,622 | 7/1991 | Marshall et al. | 345/156 |
| 5,097,252 | 3/1993 | Harvill et al. | 340/540 |
| 5,184,319 | 2/1993 | Kramer | 364/806 |
| 5,317,336 | 5/1994 | Hall | 273/148 B |

OTHER PUBLICATIONS

Virtual Environment Display System, Fisher et al., ACM 1986 Workshop on Interactive 3D Graphics, Oct. 23-24, 1986.
Antonoff, "Living in a Virtual World," pp. 83-86, 124-125, Popular Science, Jun. 1993.
Virtual Reality Products Catalogue and Resource Guide, Spectrum Dynamics, pp. 41-43, 64, 74,37,36 (1993).

Primary Examiner—Ulysses Weldon
Assistant Examiner—Matthew Luu
Attorney, Agent, or Firm—Limbach & Limbach

[57] ABSTRACT

An image display method and system in which exertion of a user's viewpoint orienting muscle groups is yoked to sensors measuring displacement and/or force to provide feedback information for control of a virtual-world without requiring full physical-motion by the user. The yoked muscle exertion is mapped to the rate and direction of movement in the virtual-world. Preferably, force exerted by, and/or rotation or translation of, the yoking device in one direction in response to exertion of the muscle groups is mapped to virtual-motion in a corresponding direction in the virtual-world. Due to the fluidity of the human vertebral column, the invention effectively yokes rotational movement of a human's viewpoint orienting muscles to virtual movement in a virtual-world without the disadvantages of a head-mounted display. To orient toward an area-of-interest in a leftward portion of a virtual-world, the user simply and naturally activates muscles that would be used to orient left in the physical world. At the same time, the effect of virtual-motion as the displayed image viewpoint moves is compelling because while the muscles are contracting, special sensory information is sent to the brain to indicate that such movement should be occurring.

24 Claims, 13 Drawing Sheets

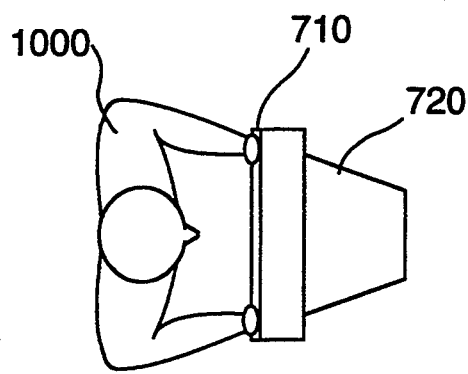
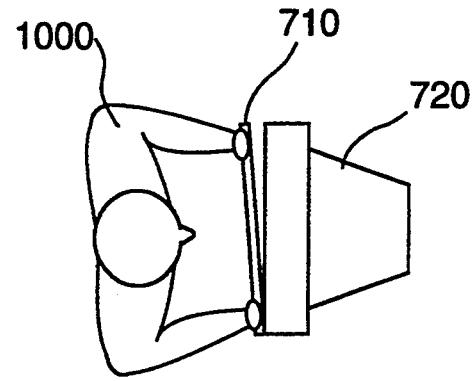
FIG. 14A  FIG. 14B
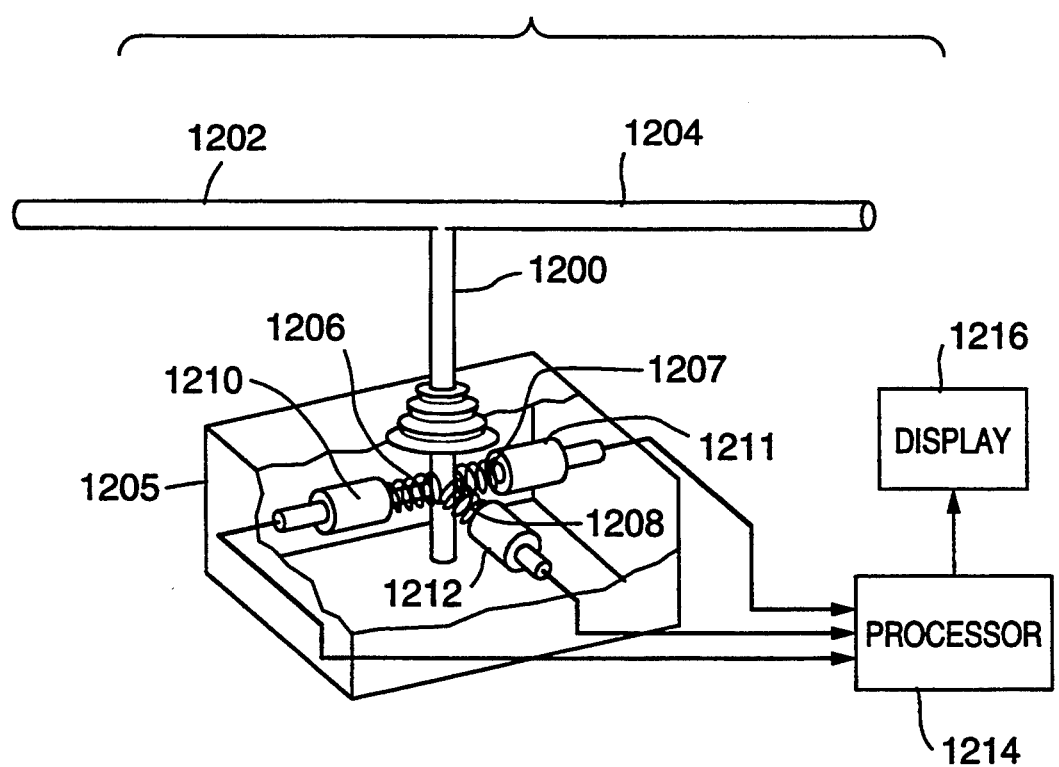
FIG. 15

IMAGE DISPLAY METHOD AND APPARATUS WITH MEANS FOR YOKING VIEWPOINT ORIENTING MUSCLES OF A USER

BACKGROUND OF THE INVENTION

1. Field of the Invention

The invention relates generally to the field of image display methods and devices which display images representing virtual environments, and more particularly to improved methods and apparatus for producing the psychological effect of free and unlimited movement in a virtual environment in response to limited physical movement by a user.

2. Description of Relevant Art

The following description and analysis of the prior and present art is based on our working hypotheses concerning the emerging art of virtual reality. Since the body of knowledge associated with this new field is largely speculative, our hypotheses concerning the principles of operation of the present invention are not presented as a basis of its operation but rather an aid to the understanding of and full disclosure of the present invention. A virtual environment or world is one in which some portion is artificially simulated or controlled, often via computer. A computer may, for example, create a graphic simulation of a cityscape, complete with buildings, trees, people and so forth. The buildings of this virtual environment may be complete in much detail including furniture, lighting and even other people. Environmental sounds or other sensory inputs may also be so simulated. The generated environment may be viewed on a two-dimensional display such as a computer screen or by viewing with special stereoscopic equipment by which the scenes are made to appear three-dimensional. Other devices such as special earphones may enhance the experience of the human interacting with a virtual environment. The scope of the invention relates generally to virtual worlds or environments and is meant to include telepresence or any other environment in which visual information or other sensory input is manipulated or controlled. Telepresence herein refers to remote head-coupled camera systems of the type typified by the Molly ™ teleoperated camera platform available from Fakespace, Inc., or other forms of supplying video information of this type such as from a prerecorded video disk.

The art is replete with invention relevant to computer input/output devices in the attempt to more effectively connect the human to the computer. The design of input devices and user-interface software has continually developed toward promoting more natural and intuitive human interaction with computers. For example, computer operating systems based on graphical desktop and file cabinet metaphors are often preferred to typed-line commands because users are familiar with look and use of desks and file cabinets. In the same way, the use of a mouse as an extension of the hand into the computer environment is a considerably more intuitive way to move things around in a computer environment than are typed control commands. However, while the mouse is successful as a two-dimensional desktop-metaphor device, it is considerably less successful in three-dimensional virtual environments. We believe there are special physiological and neuroanatomical concerns when connecting the human to three-dimensional virtual environments.

The salient problems of the physical human negotiating virtual environments have to do with the user's knowledge of and control of his position and orientation in the synthetic (virtual) environment. For example, in our everyday lives, when we move our head, eyes and other parts of our bodies in order to look at something, there are many and various inputs from the muscles, tendons, vestibular system and so forth which we have come to expect. It is this gestalt of the world which our brains create from this bundle of stimuli which gives us the basis for the control of our bodies in our everyday lives. Successful negotiation of the virtual environment then, is enhanced by the harnessing of these familiar but unconscious feedback systems which we humans have developed for control in the physical world, to the virtual world. Thus, the use of the hand alone, as in the mouse, to represent the motion of the non-hand parts of the body, for example the head and eyes, requires too much additional cognitive processing to engage the user in a fluid and intuitive connection to the virtual world. But imagine "looking around" by typed-line commands. All one-handed input devices such as mice, track balls, spaceballs, gloves and joysticks suffer this basic non-congruence of hand motions emulating non-hand body motions to control what one is looking at (or the non-congruence of finger motions emulating non-finger body motions to control what one is looking at). Examples of such devices include those described in U.S. Pat. Nos. 4,988,981 (issued Jan. 29, 1991) and 5,097,252 (issued Mar. 17, 1992) for controlling a computer in response to hand and finger motions, those described in U.S. Pat. No. 5,184,319 (issued Feb. 2, 1993) for controlling a computer in response to hand and finger motions (and providing force feedback to the fingers or hands wearing the devices), the Multipoint Z 3D Mouse devices available from Multipoint Technology Corporation, the Global 3D Controller device available from Global Devices, the Geometry Ball device available from CIS Graphics, Inc., and the Spaceball 2003 device available from Spaceball Technologies Incorporated.

The Spaceball 2003 device (as are mice in general) is formed for manipulation by one hand of a user. It provides soft control (by means of a key click button) for switching between a mode adapted for left handed use and another mode adapted for right hand use, and is not designed for interchangeably left and right handed manipulation.

Other conventional input devices include those resembling the yoke of a flight simulator or the steering wheel of a car, which control motion of a vehicle in a virtual environment. While more sites of sensory feedback are involved with use of these devices than with those noted above, the purpose of this art is control of a virtual-vehicle; not natural control of a virtual-body (which corresponds to the user's physical body). For example, with a virtual-vehicle, the physical-human's viewpoint is largely determined by the manipulation of the virtual-vehicle. Airplanes (or other vehicles) and humans do not have the same movement modalities. Thus, by way of example, a human's physical-rotation about his (her) vertebral column has no directly corresponding analog of movement by an input device of the "flight simulator" type. And, conversely, a push forward by the hands on the yoke of such a flight simulator will dive the virtual-airplane but a similar push of the hands in ordinary life will not cause the human to so dive. Even though the human interface device of a flight simulator is typically a yoke best manipulated by two hands, movement of the user's body does not generate corresponding movement of the airplane. Thus, in a flight simulator, to look left a user does not just turn his (her) head or twist his (her) trunk and look left but rather manipulates the flight controller yoke to bank the virtual-plane left. In summary, with this conventional type of input device, there is a decoupling of human physical-movement with control of one's viewpoint in the synthetic-world.

The aforementioned limitations of the described prior art have been addressed by the developing art of head-tracked head-mounted displays (HTHMDs). Early embodiments of such HTHMDs were developed for flight simulators. A. M. Spooner teaches such apparatus and methods for training pilots in U.S. Pat. Nos. 4,315,240; 4,31.5,241; 4,340,878; 4,347,508 and 4,349,815. Such art in combination with high-speed computing means make the simulated effect of flying an airplane so compelling that pilots can effectively be trained without leaving the ground. Other examples of HTHMDs include those available from Virtual Research, Sega of America, Inc., and others, as described in the June 1993 issue of Popular Science, at pages 83–86 and 124–125. The HTHMD art convincingly connects the natural movement of the human in the physical world to his (her) viewpoint in the virtual-world. So that, for example, when a user physically turns around, she sees what is behind her in the virtual-world. There is strong correspondence between her expected change in virtual-view based on her physical-movement sensory feedback and the actual virtual-view experienced.

Notwithstanding these benefits, systems employing such head-tracked helmet-style devices do present a variety of problems with their practical use.

Since the human head varies greatly in size and shape, it is difficult to fit a standard-sized head-mounted display to the general population. An unobtrusive fit is important since the experience of virtual reality is greatly enhanced when the user is unencumbered by the system. In addition, their small size requires them to be fitted with small, expensive, and typically heavy, high-resolution visual displays. In multiple-user environments, HTHMD are not hygienic. Respiratory contagions as well as hair parasites such as lice and scabies can be transmitted via these devices. In short, head-mounted displays tend to be heavy, poorly balanced on the head, non-hygienic and slow to setup.

Furthermore, the current art of head-mounted displays requires an information-conducting means in the form of an umbilical-like cable attachment to the computing means which is prone to failure and inherently awkward to manipulate. Also, the intuitive interface for navigating in the virtual-world provided by the HTHMD only works within the range of the head-tracking device. Activity is, in effect, confined to an area relatively proximate to the head-tracker reference sensor means. If the virtual-world is the world of an airplane cockpit, this is less of a problem than if the virtual-world is a cityscape. Common forms of positional tracker attachments to HTHMD are available from Polhemus Corp. and Ascension Technology Corp. Virtual-navigation or positional change outside of the relatively small envelope of the above devices requires some other, non-physically intuitive means of movement in the virtual world. One such device, disclosed in U.S. Pat. No. 4,988,981 (referenced above), comprises a glove with integrated position sensing means for finger movements and a second external position sensing means for hand rotation and translation in three dimensions. The image displayed within the virtual-environment is that of a crude, working hand. The user may point in a direction and then activate a means of "flying" in that virtual-direction. The user may also manipulate objects within the virtual-environment by seemingly grasping them. The operation of the glove device is only natural and intuitive with the movement of the fingers and the axial rotation of the hand. Human locomotion is still accomplished by virtual-flying or gliding directed by a hand which has no physical-world analog.

Lastly, HTHMD systems often pose problems with the use of and amount of physical space needed to contain the volume in which the user will physically move. For example, if the intended use is for public entertainment arcades, then the relatively large kiosk footprint leads to poor profitability because the revenue per area ratio is reduced. Or if the intended user has limited work space such as a scientist or engineer limited to his work cubicle, then HTHMDs are less feasible. However, in the case of a flight simulator, the HTHMD works well because the pilot trainee is already physically constrained to movement within the relatively small cockpit.

Consider, however, the problem of moving about in a virtual-building, for example to go from room to room inspecting furniture. It would be appropriate to design the virtual reality system to have a physical volume matching the size of the virtual-building. In practice, usually either some method of changing the scale of physical-movement to virtual-movement or the use of some alternative mode of movement representation is employed to deal with this problem. For example, by making hand gestures with the aforementioned instrumented glove, virtual-buttons might be pressed to virtually-fly around the building. Then, in order to inspect the furniture closely, one may need to change the interface mode back to the original one whereby human physical-motion is mapped one to one with virtual-motion. Thus to navigate large virtual spaces among the rooms or pieces of furniture in the rooms, conventional technology would use one of the aforementioned devices and methods of virtual-movement which do not inherently exhibit congruence of physical-motion with virtual-motion. This mode changing in order to accommodate gross and fine movement is a significant drawback to the practical implementation of virtual reality systems.

In sum, even though the head-mounted displays of the current art do effectively pair motion in the physical world with that of the virtual world, they present a variety of problems with their use.

In daily life when we want to see something, we just move our bodies around by walking, bending, turning and so forth until we can see it. It is by such naturally coordinated movement that we change our present viewpoint to some new, desired viewpoint. The terms "viewpoint," "view," and "area-of-interest" as used herein will be defined with reference to FIGS. 10, 11 and 12. FIG. 10 is a schematic diagram of a section of railroad track as seen from the top. At point A, the user's "viewpoint" (the position and orientation from where the user is looking) is depicted by the arrow emanating from the circle around A. FIG. 11 depicts the "view" or visual content from viewpoint A, that is, what is actually seen from viewpoint A. In order for the viewpoint to move from A to B, the user must move along the track to point B and then look left or, in other words, change her position to B and orient left. FIG. 12 depicts an approximate view from B. Another way to state the above scenario is to say that the movement of the user's viewpoint from A to B is the result of having changed her "area-of-interest" from that depicted in FIG. 11 to that of FIG. 12. While the above terms refer specifically to vision, other senses such as audition or olfaction, which involve similar spatial-perceptual problems for the human in virtual-words are meant to be within their scope.

While we have very sophisticated and naturally integrated human hardware for dealing with the physical-world, we have no such natural interface to support behavior in simulated or virtual-worlds. The prior art in the form of head-mounted displays, tactile feedback devices, instrumented gloves and body suits and so forth, are improvements to the art of more closely connecting the human to a non-physical world. They provide proprioceptive and other state-of-the-body position and orientation information to the user as useful feedback for control of virtual movement. Unfortunately, the prior art still suffers from the deficiencies a ready outlined. The present invention offers a number of advantages including improved intuitive and effective feedback control in a small physical space.

SUMMARY OF THE INVENTION

The present invention is a class of methods and apparatus in which exertion of the user's "area-of-interest orienting" (or "viewpoint" orienting) muscle groups (or a subset thereof) is yoked and measured, while actual movement of the muscles is constrained. The expressions "area-of-interest orienting muscle groups" and "viewpoint orienting muscle groups" are used interchangeably herein to denote, generally speaking, human muscles having either their origins and or insertions on the spinous and or transverse processes of the vertebral column, or having their insertions on the calvarium and on the pelvic bones, which act to produce head movement (and thus to control the viewpoint) in the various rotational degrees of freedom. Herein (including in the claims), the term "force" is used in a broad sense to denote force or torque.

The yoking of the viewpoint orienting muscle groups to a means for sensing displacement and/or force in accordance with the invention provides force and/or positional feedback information for control of a virtual-world without requiring full physical-motion from the user. The invention further provides for mapping the yoked muscle exertion to the rate of and direction of movement in the virtual-world. The force exerted by, and/or the rotational or translational displacement of, the yoking means in a given direction (in response to exertion of the viewpoint orienting muscle groups) is mapped to virtual-motion in a corresponding direction in the virtual-world. For example, user exertion of clockwise torque on the yoking means (with respect to a vertical axis) is mapped to clockwise rotation (panning) of the viewpoint in the virtual-world (with respect to the vertical axis in the virtual-world).

The advantages and working of the invention can be better explained and understood by the following consideration of three neuroanatomical and structural principles of the body.

First, the vertebral column is substantially fluid and flexible. Generally speaking, the intersection of a rotation plane and its axis of rotation can occur nearly anywhere along the vertebral column from the lumbar area up to the base of the skull. For example, when humans pan or orient towards an area-of-interest, this rotation could occur at the neck or it could occur at the level of the Shoulders while keeping the neck stiff or it could occur at the level of the hips while keeping the neck and shoulders stiff or some combination of these movements. The same is true of pitching and rolling motions.

Second, the muscles which move and orient the head and trunk send special sensory information to the brain while they are contracting. This special sensory information permits knowledge of one's orientation independent of other sensory cues such as sight or balance. Therefore, simply by the action of the muscles that orient the head and trunk we can know when we have substantially achieved an orientation.

Lastly, voluntary muscular coordination is driven by our perception of achieving an end-point or goal of a muscular movement. This means we tend to exert as much force as required, but only enough force to efficiently reach our desired end-point. This has been called the law of minimal spurt action. (See *Essentials of Human Anatomy*, Woodburne, Oxford Press, 1978, p. 15.)

The present invention capitalizes on these three principles. Because of the fluidity of the vertebral column, the invention effectively yokes the movement of the viewpoint orienting muscles in the physical-world to movement in the virtual-world without the disadvantages of a head-mounted display. Therefore, to orient toward an area-of-interest in the leftward portion of the virtual-world, the user simply and naturally activates the muscles that would be used to orient left in the physical-environment (or a subset of such muscles). At the same time, the effect of virtual-motion as the virtual-view moves toward a new virtual-area-of-interest is compelling because while the muscles are contracting, there is special sensory information sent to the brain telling it that such movement should be occurring. This movement is confirmed by the smooth flow of images in the display depicting movement toward an area-of-interest until the area-of-interest is perceived. Hence the perception of natural and intuitive bodily movement has occurred even though only constrained bodily movement has actually taken place.

The present invention not only provides means for yoking the viewpoint orienting muscles to appropriate virtual-motion but also provides means for mapping the actual physical-force applied by the muscles to the system of the invention to the rate of and direction of this virtual-motion. In addition to the above principles, the inventors have observed a nonlinear relation between muscle exertion and the expected change of virtual-motion. While there is support in the literature for the thesis that the amplitude of postural change is logarithmically proportional to virtual-image velocity (see Boff and Lincoln, *Engineering Compendium: Human Perception and Performance*, AAMRL, Wright-Patterson AFB, Ohio, 1988), our experience is simply that one expects a constant velocity with constant force applied and that incremental increases in virtual-velocity expected require increasing amounts of physical-force applied.

As an example of practice, a user may be seated in front of a computer system which embodies the invention with his two hands grasping the inventive input device. The arms are ordinarily substantially rigid so that the user can forcibly interact with the input device using area-of-interest orienting muscles of his neck and- /or trunk. The resulting force and/or position information is fed to a computer in which commands are generated which control motion in the virtual world. In this way, the user manipulates his virtual area-of-interest, for example so that if he physically turns left the visual presentation to him changes to correspond to the virtual-world to the left. When the user sees what is desired, that is, reaches his area-of-interest, his muscles begin to relax and the virtual-motion is accordingly slowed to a standstill.

It has been found that after using the device of the invention, users can be trained to operate the device with different muscle groups, including nonviewpoint orienting muscle groups to achieve similar device operation while retaining a level of intuitive control.

The present invention, then, exemplifies the new, useful and nonobvious art of mapping constrained-motion exertion of area-of-interest orienting muscle groups with an appropriate and expected rate of change in area-of-interest in a virtual-world. The inventors have been impressed with the invention's effectiveness to pair muscle exertion with apparent virtual-motion thereby providing free movement in a virtual-world without having to leave one's chair. The following description of various embodiments explains various modes of implementing the invention each with its set of relative advantages.

BRIEF DESCRIPTION OF THE DRAWINGS

Some details of the accompanying illustrations are omitted for clarity.

Each of FIGS. 14A and 14B is a schematic top view of a user of the second embodiment.

FIG. 15 is a partially cut away, perspective view, partially schematic view, of a third embodiment of the invention.

Figure 16:
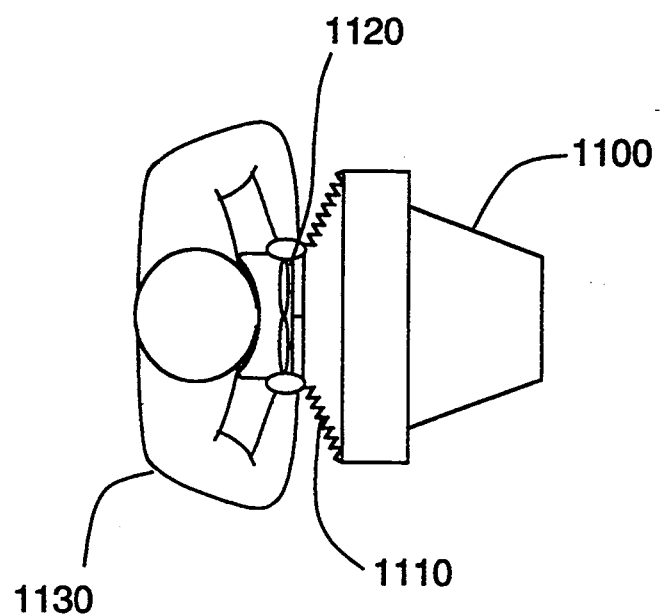

FIG. 16 a schematic top view of a fourth embodiment of the invention.

Identification of the Reference Numerals

100 Baseplate
110 Pan Pivot
120L,120R Left and right springs
130 Yoke
140 Pan Angle Sensor
160 Pin
190 Display Head (viewing and processing means)
200R,200L Left and right lenses
220 Handle
230 Button
250 Display Assembly
260R,260L Left and right spring mounting brackets
270 Yoke Bottom Cross-member
500 user
510 system of the invention
520 startup
530 view-mode
540 movement-mode
550 pan sensor
560 computer
570 image generation software
600 software which programs the computer
610 clock
630 current virtual-pan
640 updated virtual-pan output
1000 user
1010 system of the invention
610 clock
700 pushscreen hardware assembly
710 yoke
711 wood side members
712 steel top member
720 monitor
compression spring
740 pressure sensors TR, BR, TL, BL
750 extension spring
751M,751F eyelet
760 spring cup
770 sensor assembly
780 mounting blocks on monitor
790 locations TR, BR, TL, BL
800 sliding plug
810 rubber backing member
820 fixed plug
830 hole
840 step of sliding plug 800
850 sensing surface
860 computer (such as an IBM PC)
870 computer (such as an SGI computer)
880 digitized sensor data via RS232 port
900 software which programs the computer
910 startup
920 current flying along current heading 940
930 updated flying
940 current pan-angle
950 updated pan-angle
960 image generator
1100 display device
1110 force and position and orientation sensing spring mount
1120 optics assembly
1130 user
1200 handle mount
1202 left handle
1204 right handle
1205 housing
1206,1208 springs
1210,1212 force sensors
1214 processor (programmed with software)
1216 display device

DESCRIPTION OF THE PREFERRED EMBODIMENTS

Since there are a number of terms commonly used in naming the six degrees of freedom, this specification will use interchangeably the terms "pan", "heading", "horizontal orientation" or "yaw" to represent rotational movement in the horizontal plane about the vertical axis. Using the righthand rule convention, positive yaw is counterclockwise rotation. The term "fly" with any of the terms "in", "toward", "out", or "away" is sometimes used herein to denote translational movement along a heading.

Figure 1:
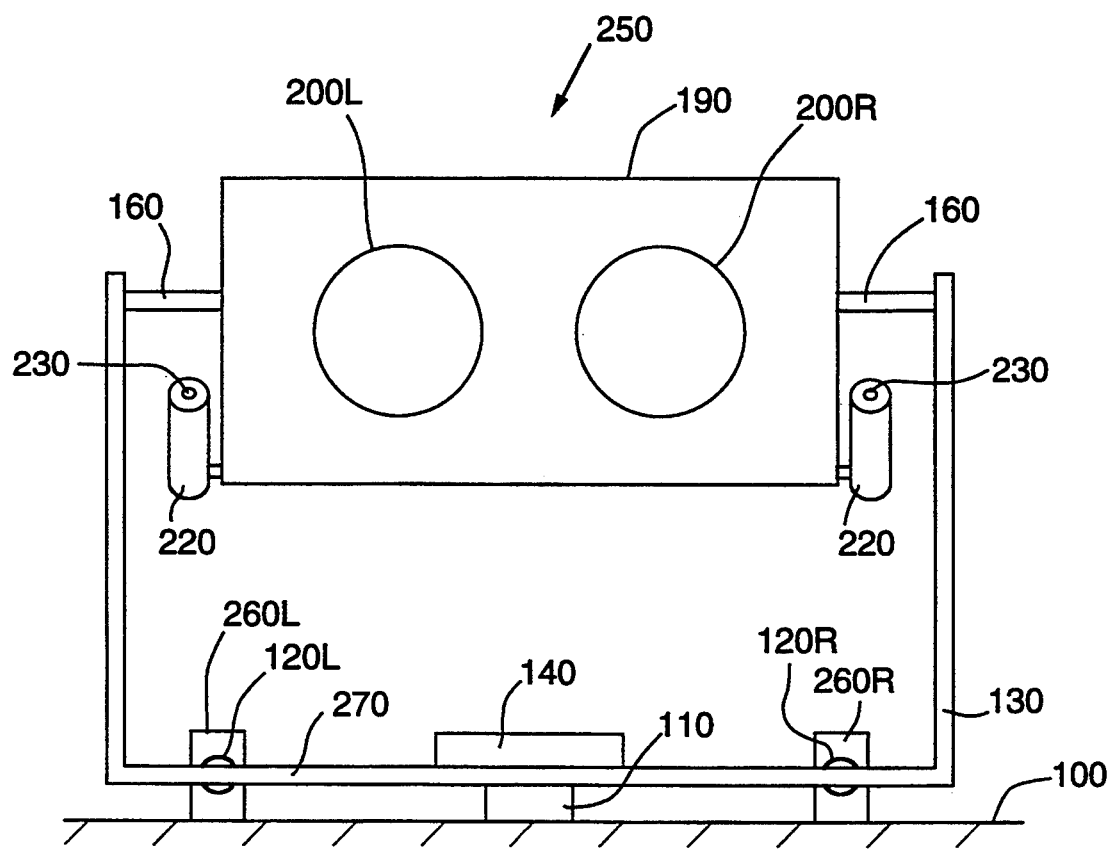
FIG. 1 is a front view of a first embodiment of the invention.
Figure 2:
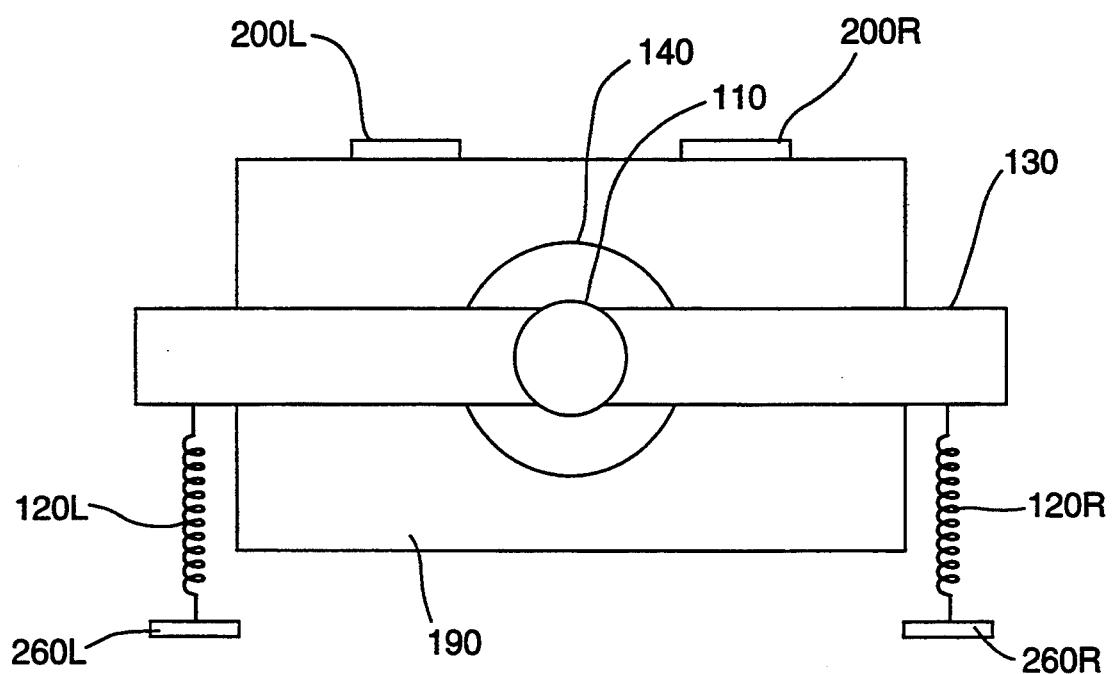
FIG. 2 is a bottom view of the first embodiment.

Referring now to FIGS. 1 and 2, a first embodiment of the invention is comprised of display assembly 250 which is exemplified by a commercially available product from Fakespace, Inc. known as the BOOM HD product. The first embodiment also comprises a computer processing means (not shown in FIGS. 1 or 2) programmed with algorithms to be described below, springs 120, and spring mounting brackets 260. Springs 120 are further comprised of spring 120L on the left and spring 120R on the right. Similarly, mounting brackets 260 are further comprised of mounting bracket 260L on the left and mounting bracket 260R on the right.

Since display assembly 250 is available as a unit commercially, the following brief description is offered mainly as an aid to understanding the drawings and presenting alternative forms. Display assembly 250 includes viewing and processing means 190 connected to yoke structure 130 at pins 160. Yoke 130 is connected to baseplate 100 at a pivot 110 rotatable about the vertical axis of the pan plane (the vertical axis in FIG. 1). Baseplate 100 is of aluminum plate or other material sufficient to support the other hardware of the present invention. Pan pivot 110 is a bushed or rolling element bearing or other such device. Yoke 130 is made of aluminum flat bar or other suitable material, and is shaped in substantially a U configuration with a straight bottom cross-member 270. At a point substantially at the center of bottom cross-member 270 of yoke 130, pivot 110 attaches yoke 130 to baseplate 100. Yaw sensor 140 is one of the well-known types of sensors used for sensing rotational position, such as the optical encoder employed in the BOOM HD product or a potentiometer. Display head 190 comprises viewing optics 200, handles 220, and buttons 230. Viewing optics 200 comprises optics 200L on the left and optics 200R on the right. Handles 220 are "human interface portions" of display head 190 in the sense that they are portions of head 190 on which the user exerts muscular force.

Figure 13:
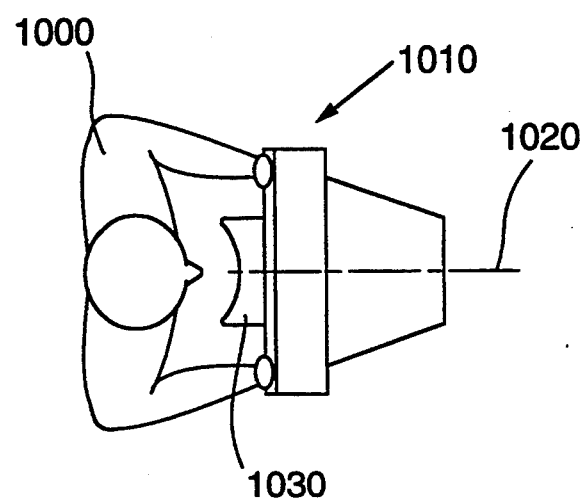
FIG. 13 is a schematic top view of a user of the first embodiment.

As a matter of definition for this document, the normal-position of the user is when the eyes, head, shoulders, hips and so forth, are substantially in a normal, relaxed, straight-ahead position (facing into the plane of FIG. 1). With reference to FIG. 13, user 1000 with line of sight 1020 is depicted in his normal-position with respect to the at-rest position of device 1010 embodying the present invention. When the user is this normal-position, the at-rest position or straight-ahead position of the inventive device of FIGS. 1 and 2 is when the optic axes of optics 200L and 200R are substantially parallel to the user's sagittal plane and when yoke 130 as well as the face of display head 190 are substantially parallel to the user's coronal plane. In FIG. 13, element 1030 is an optional set of eye cups which help shield the display from room light and more closely engage the user with the device.

Referring now particularly to FIG. 2, each of springs 120R and 120L is an extension spring of a type well known in the art (preferably a spring substantially 1.5 inches in length, with a ⅜ inch outside diameter, and a spring constant of approximately 5 pounds per inch, commercially available as part number 562 from Century Spring Corp.). Each of spring mounting brackets 260R and 260L is L-shaped aluminum or other material of sufficient strength and size to fixedly mount one of springs 120R and 120L at one end. One end of spring 120L is mounted to bracket 260L and the other end of spring 120L (the back end away from the user) is mounted to cross-member 270 of yoke 130 substantially three inches to the left of pan pivot 110. One end of spring 120R is mounted to bracket 260R and the other end is mounted to the back side of cross-member 270 substantially three inches to the right of pan pivot 110. Brackets 260 are aligned substantially 1.75 inches from the back side of cross-member 270 in its at-rest position at such height and alignment that mounted springs 120 can be mounted substantially perpendicular to cross-member 270. When springs 120 are connected in the manner just described, display 190 is urged toward its straight-ahead position.

As the display head 190 is panned right, the spring 120R is further urged and extended from its at-rest position while spring 120L is accordingly relaxed from its at-rest position. As display head 190 is panned left, spring 120L is further urged and extended from its at-rest position while spring 120R is relaxed from its at-rest position.

In a typical use scenario, a user grasps handles 220 and peers through viewing optics 200. As the user pans display head 190 (by rotating head 190 about pivot 110 and/or applying torque to head 190 about the vertical axis of pivot 110), the images displayed are updated such that the movement of display head 190, that is to say also, the force applied to display head 190, and the change of the images displayed substantially correspond. It can be seen from the arrangement of springs 120 that the pan movement of display head 190 is proportional to the force applied. In this way, the force applied to move display head 190 is mapped to the movement of and rate of movement of the viewpoint of the virtual-scene generated for display.

Buttons 230 of handles 220 are of a momentary spst type and may be activated thereby producing some further update of the displayed images. For example, the buttons might fire a virtual weapon in an simulated war game. Or, the buttons might fly toward or fly away from the virtual-scene, that is, update the view of the displayed images to reflect the new viewpoint resulting from translational movement in the image space.

Figure 3:
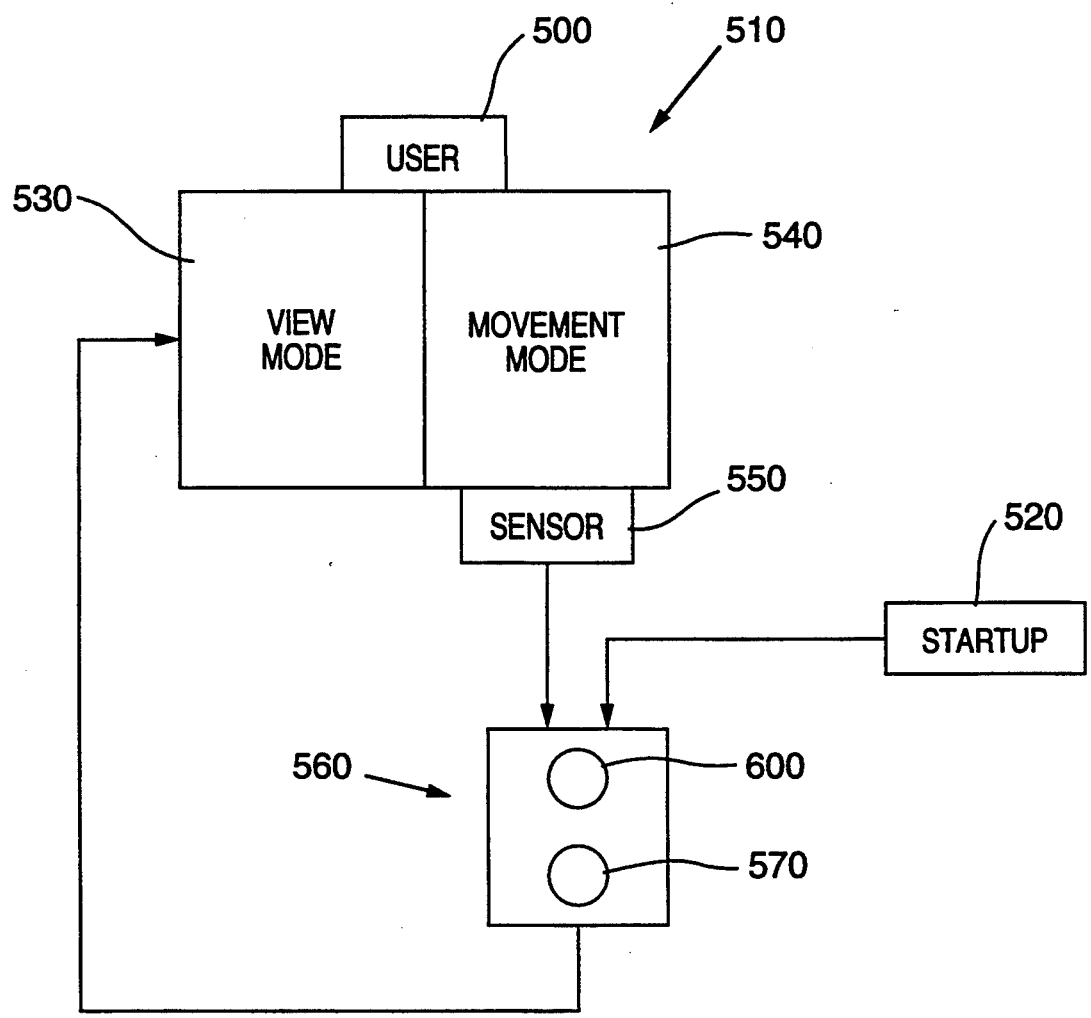
FIG. 3 is a block diagram depicting a typical use scenario of the first embodiment.

We next describe FIG. 3, which depicts user 500 and his practical relation to device 510 embodying the invention. Device 510 includes means for enabling the user to view a virtual-scene (view-mode 530) and means for physically engaging the user's area-of-interest orienting muscle groups (physical movement-mode 540). In response to startup command 520, computer 560 executes software to select an initial viewpoint and initialize all related systems such as optical encoder outputs, orientation matrices and so forth. By visually interacting with view-mode 530, the user visually receives image data relevant to his current viewpoint. Substantially at the same time, the user may engage movement-mode 540. As stated before, referring now additionally to FIG. 1, in a typical use scenario, movement-mode 540 includes handles 220 (or the like) which are grasped by the user, and view-mode 530 includes viewing optics 200 through which the user looks. As the user pans movement-mode 540 (e.g., rotates display head 190) the physical-pan position of the movement-mode 540 (e.g., display head 190 of movement-mode 540) is made available to computer 560 via the output of sensor means 550 (sensor means 550 can be sensor 140 of FIG. 1, or one or more other sensors). Computer 560 processes position data from sensor means 550 by executing computer software 600 (with which computer 560 is programmed) and, as a result, generates updated image control commands which are then sent to image generating means 570 of computer 560. Image generating means 570 then sends the updated image information, now corresponding substantially to the updated viewpoint of the user, to view-mode 530 (e.g., to viewing optics 200 of display head 190). In this manner, generally speaking, the user changes his viewpoint in the virtual-world by his physical-exertion in the physical-world.

Figure 4:
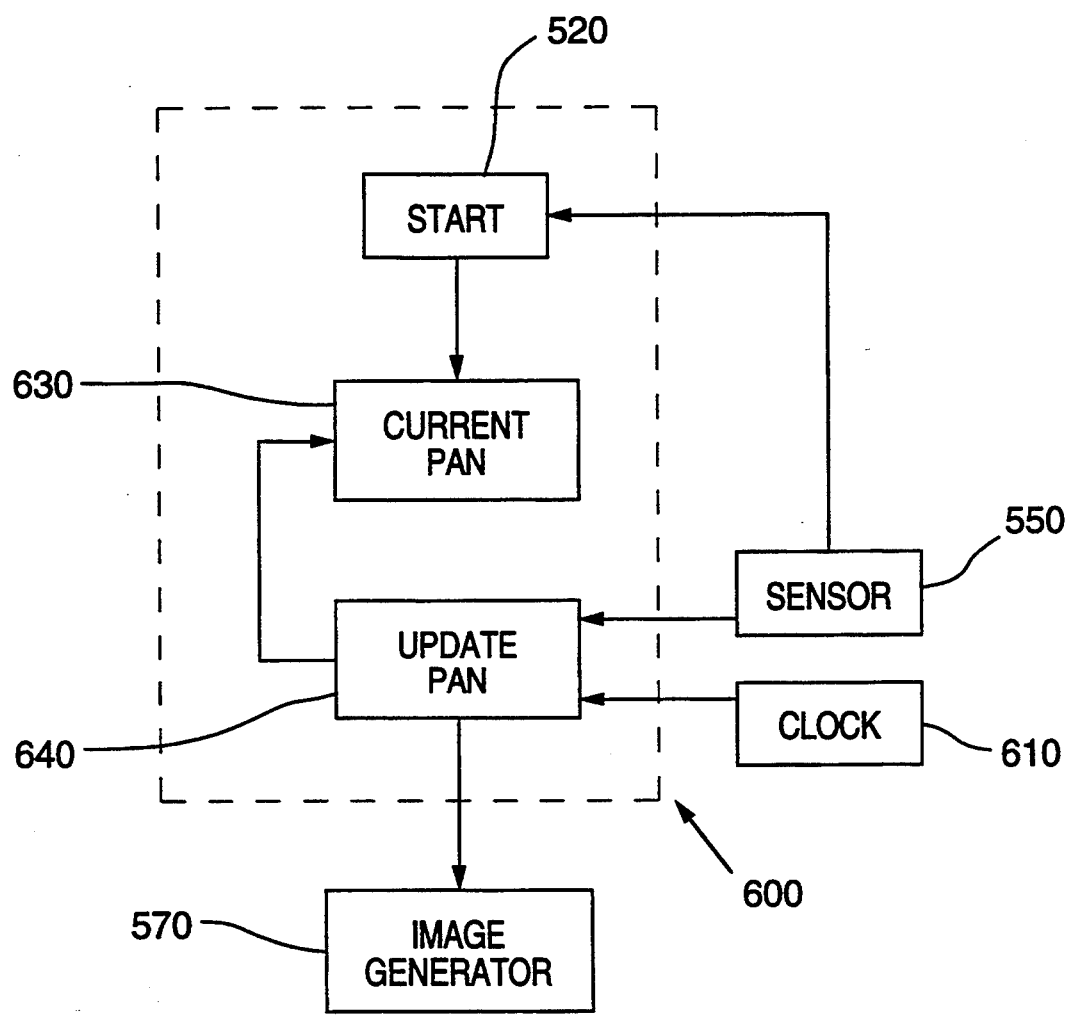
FIG. 4 is a flow chart of a portion (including software portion 600) of the FIG. 1 embodiment for deriving virtual-pan from physical-position.

In accordance with standard programming practice and in particular, for programming Silicon Graphics computers according to the 1.1 IRIS Performer Release Notes manual, the following is a description of the computer software algorithm implemented by software portion 600 in a preferred implementation of the FIG. 3 embodiment of the invention. Referring now to FIG. 4, software 600 receives inputs such as input data representing time (from real-time clock 610) and input data representing physical-pan angle (from sensor means 550). In response to startup command 520, the current virtual-pan angle 630 and the physical pan-angle from sensor means 550 are initialized to zero. At clock ticks from clock 610, typically less than twenty milliseconds apart, physical-pan angle data from sensor means 550 are read and updated virtual-pan angle 640 is generated by incrementally updating the current virtual-pan angle 630 according to the following algorithm: updated virtual-pan angle 640:=current virtual-pan angle 630+f(physical-pan angle).

While function f(physical-pan angle) may be any of a variety of functions of the physical-pan angle from sensor 550, in a preferred embodiment f(physical-pan angle)=(physical-pan angle)/2. The scale factor ½ was chosen empirically and represents a scale factor between the force exerted on springs 120R and 120L and the rate at which the virtual-pan changes. Image generator 570 thus generates updates the virtual-view or scene on the basis of updated virtual-pan angle 640 as calculated above; not on the basis of the user's actual physical-pan angle (as determined by sensor 550). It should be understood that the most recently updated angle 640 becomes, at the next tick of clock 610, the current virtual-pan angle 630 for the next value of updated virtual-pan angle 640. It should also be understood that the calculated virtual-pan 640 is a mapping of the force applied in turning display 190 to the rate of movement of the of the virtual scene. In this way, exertion of the user's viewpoint orienting muscles is mapped to movement of and rate of movement of the virtual scene.

Sensor means 550 can be implemented as the above-described yaw sensor 140, or as one or more other sensors (such as differential force sensors). In variations on the FIG. 1 embodiment, different kinds of springs can be employed, different mappings between applied force and virtual-movement can be implemented in software, force or torque exerted with respect to all axes can be sensed, and various degrees of freedom of limited motion can be allowed. For example, torque about each of two orthogonal axes (an X axis and a Y axis) can be measured and mapped to corresponding virtual rotations about each of two orthogonal axes in virtual-space.

Figure 7:
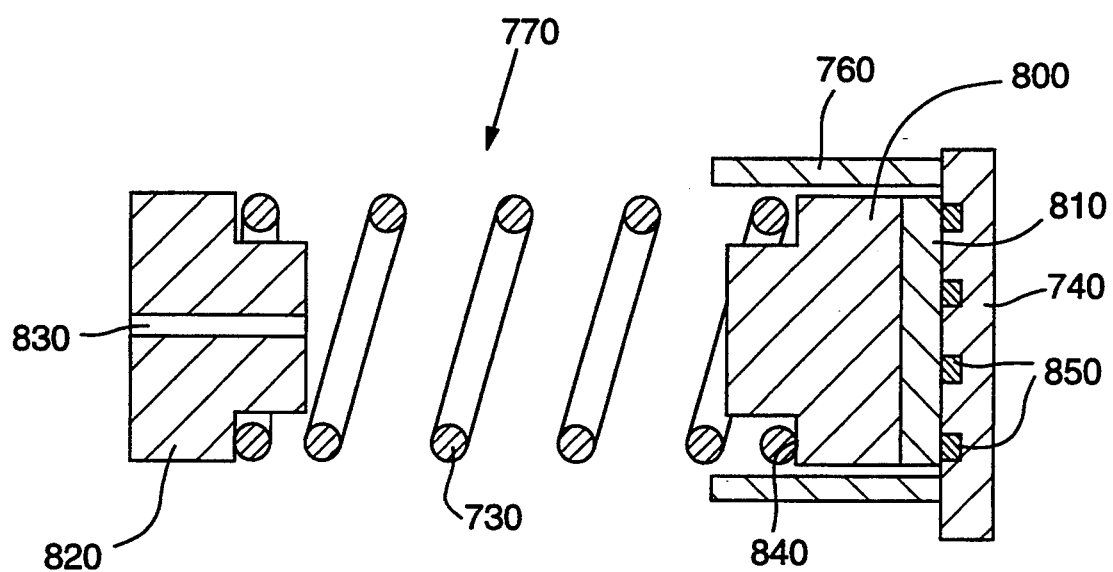
FIG. 7 is a cross-sectional view of a sensor assembly of the second embodiment.
Figure 8:
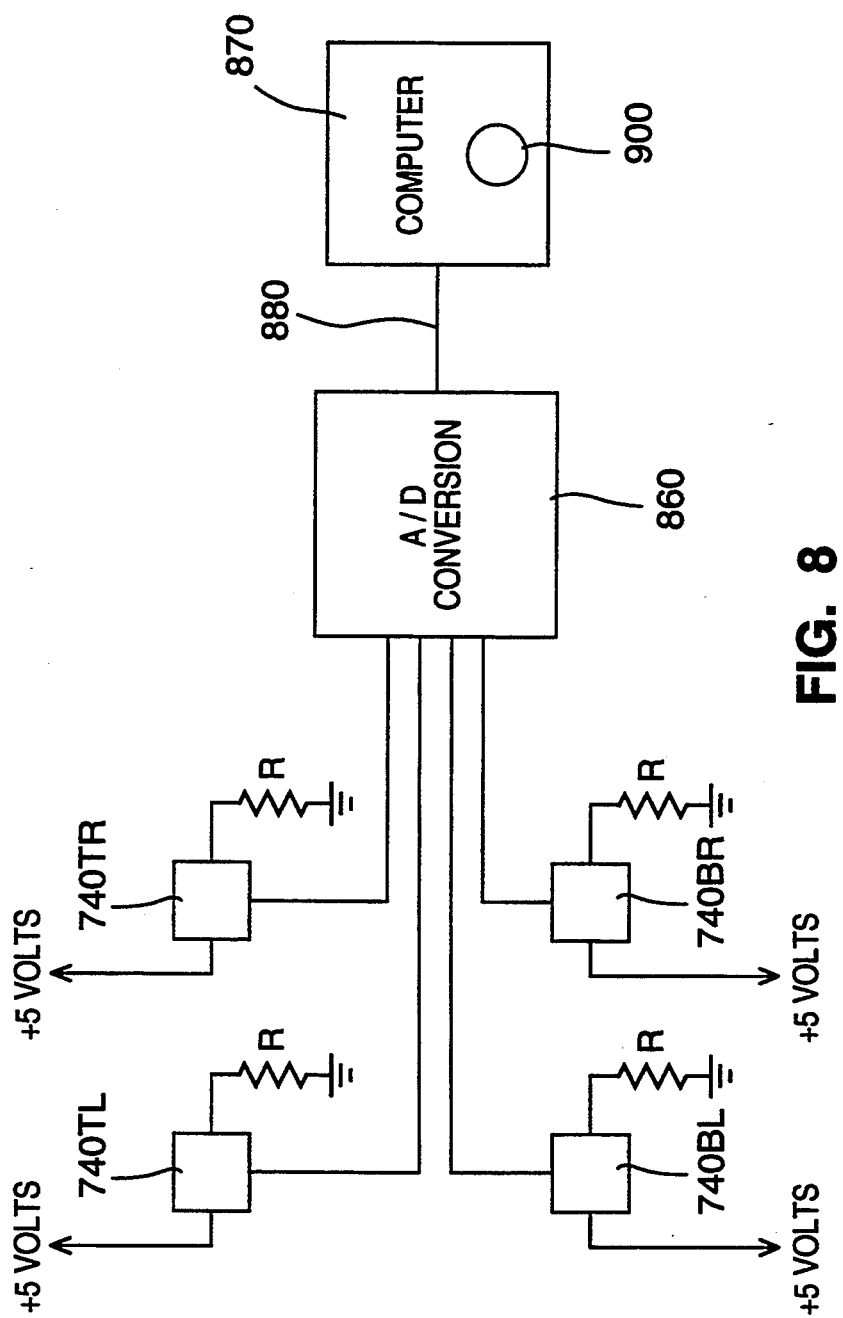
FIG. 8 is a schematic of the hookup of sensors and computers of the second embodiment.

A second embodiment of the present invention (to be described with reference to FIGS. 5, 6, 7, 8, 14A, and 14B) includes assembly 700, display monitor 720, and programmed computer processing means 870 (shown in FIG. 8). Assembly 700 includes yoke 710, extension springs 750, and pressure sensor assemblies 770.

In a typical use scenario of the embodiment of FIGS. 5–8, a user (such as user 1000 of FIG. 14A) grasps yoke 710 by its left and right portions 711 (members 711) and peers through yoke 710 thereby viewing screen 721 of monitor 720 as depicted in FIG. 14A. As user 1000 changes his (or her) direction-of-interest rotationally leftward (by rotating yoke 710 to the position shown in FIG. 14B and/or applying torque to yoke 710) the images displayed by monitor 720 are updated such that the movement of yoke 710, (and/or the force or torque applied to yoke 710), and the change of the images displayed substantially correspond. It will be seen from the description below of the preferred springable attachment of yoke 710 to monitor 720 that the panning movement of yoke 710 is proportional to the force applied. In this way, the force applied to move yoke 710 is mapped to the movement of and rate of movement of the viewpoint of the virtual-scene displayed by monitor 720.

Members 711 are "human interface portions" of yoke 710 in the sense that they are portions of yoke 710 on which the user is intended to exert muscular force.

Figure 5:
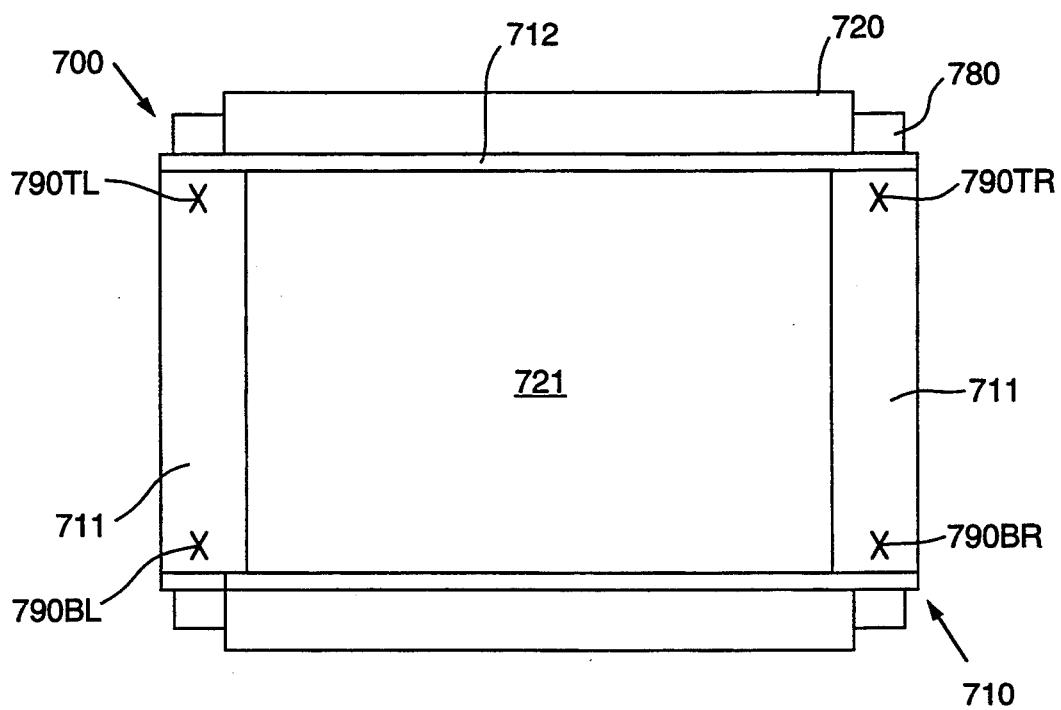
FIG. 5 is a front view of a second embodiment of the invention.

Referring now to FIG. 5, yoke 710 can be formed of 2 inch×4 inch left and right side members 711 (each approximately 10 inches long) made of wood, and inch×¾ inch steel angle top and bottom braces 712 connected between left and right members 711. Steel members 712 are screwed to the wooden side members 711 to form a substantially rigid frame structure 710 which is approximately 10×24 inches in size, and which is mountable to display monitor 720 in a position framing the screen 721 of monitor 720.

Referring now to FIG. 7, each sensor assembly 770 includes a spring cup 760 which can be PVC tubing of common manufacture (nominally 1.25 inch in outside diameter, one inch in inside diameter and ½ inch long). Each sensor assembly 770 also includes a sliding plug 800 (preferably made of Delrin material) which is substantially cylindrical in shape, approximately ½ inch in overall length, and has a step 840 at approximately its midpoint such that its large diameter portion measures one inch in diameter and its small diameter portion measures 0.76 inches in diameter, so that spring 730 may slidably fit over the small diameter end and seat on step 840 (with plug fitted within cup 760). Each compression spring 730 has a nominally 15/16 inch outside diameter and a two inch free length, and is made of 0.080 inch hard drawn wire, rated at 16.43 pounds per inch. Rubber backing piece 810 is attached (such as by glue) to the large diameter end of plug 800, with piece 810 substantially covering the large diameter end surface of plug 800. Sensor assembly 770 also includes resistive ink sensor 740 (which can be one made by Interlink). An open end of spring cup 760 is attached (such as by glue) to the periphery of one face of sensor 740 such that the approximately ⅜ inch square sensor surface 850 is substantially cinctured by spring cup 760. In normal use, sliding plug 800 with its rubber backing 810 slidably fits in cup 760 such that pressure applied to plug 800 is substantially evenly distributed over the sensing surface of sensor 740. Sensor assembly 770 also includes fixed plug 820 which is can be identical to plug 800 except that it has a clearance hole 830 through its central axis for screwably attaching plug 820 to one of wood side members 711.

Figure 6:
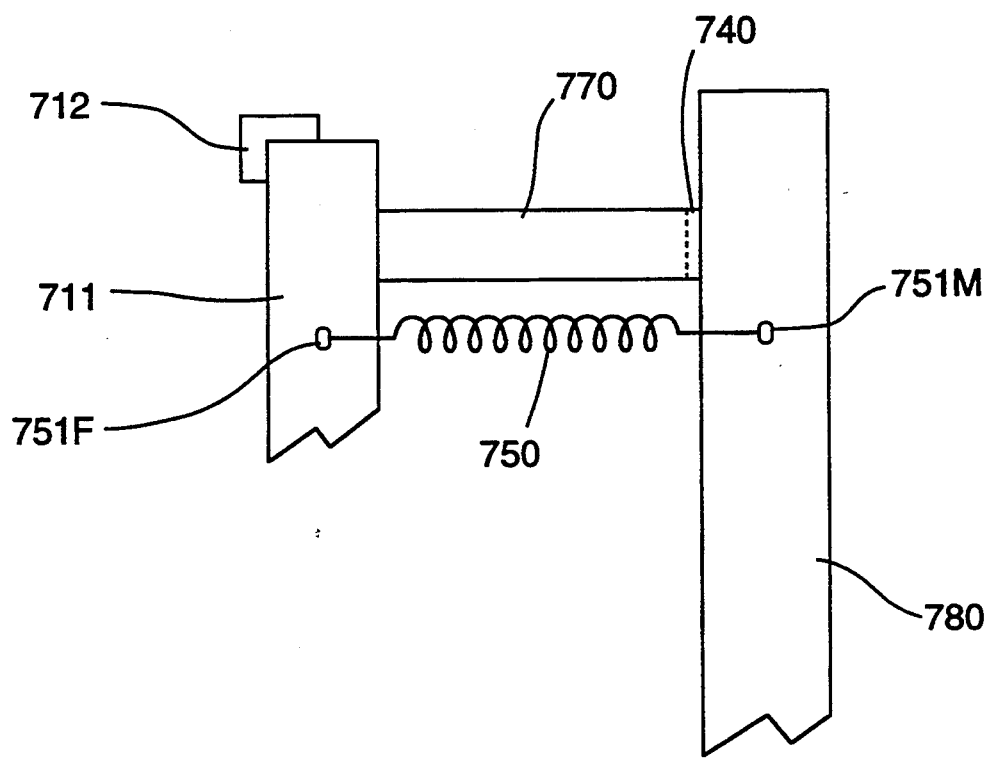
FIG. 6 is a side view detail of the second embodiment.

Referring now to FIG. 6, each of extension springs 750 is nominally ⅜ inch in outside diameter, 3.25 inches long, and is made of 0.072 inch hard drawn wire rated at 6.43 pounds per inch. Mounting blocks 780 can be substantially 2 inch×4 inch wood members 12 inches long.

The construction of assembly 700 and its attachment to monitor 720 is as follows. A vertically oriented mounting block 780 is attached (such as by glue) to each of the left and right sides of monitor 720, such that a narrow (front) face of each block 780 is substantially coplanar with screen 721 of monitor 720, and so that yoke 710 can be positioned in front of the plane of screen (with sufficient space between blocks 780 and yoke members 711 for mounting assemblies 770 therebetween as shown in FIG. 6). The four plugs 820 of four sensor assemblies 770 are attached (such as by screws) to the backside of yoke 710, each one substantially along the center line of one of members 711, with their centers approximately 1 inch from the top and bottom corners of yoke 710. Referring now to FIG. 5, the four "x" marks 790TL, 790BL, 790TR, and 790BR, depict the intersections of front side members 711 of yoke. 710 and the centerlines of the four screw hole locations for plugs 820. For future reference, the four sensors 740 and their related outputs are further identified according to their positions shown in FIG. 5 so that 740TR is the sensor 740 at top right position 790TR, sensor 740BR is at bottom right position 790TB, sensor 740TL is at top left position 790TL, and sensor 740BL is at bottom left position 790BL.

Sensor 740 of each of four sensor assemblies 770 is mounted (such as by glue) to one of blocks 780 (mounted in turn to monitor 720) such that when yoke 710 is mounted to monitor 720, each plug 820 on yoke 710 is aligned with a corresponding sensor 740 on mounting block 780.

Mounting eyelets are attached to the side faces of members 711 and blocks 780 for mounting extension springs 750. Mounting eyelets 751 are a common type for screwing into wood (and can have an approximately 5/16 inch inside diameter circular opening). The extension spring eyelet pairs, each comprising eyelet 751F in yoke 710 and eyelet 751M in block 780, are screwed one eyelet each to the outside of yoke side member 711 and the outside of mounting block 780 such that a line through the opening centers of each pair is substantially proximate to and parallel to the axis of one of the aligned pairs of plugs 800 and 820.

The assembly of this hardware portion of the invention is completed by installing four compressed springs 730 between their respective mounting cups 760 and plugs 820 such that yoke 710 and monitor 720 are connected to each other by springs 730 in a substantially parallel orientation. Extension springs 750 are then hooked to their respective eyelets 751. Each aligned pair of eyelets 751 are approximately four inches apart so that the preload of the system of four springs 730 (tending to push yoke 710 away from monitor 720) and the preload of two pairs of springs 750 pairs (in the opposite direction, tending to pull yoke 710 toward monitor 720) have substantially equal magnitudes (though in opposite directions) at each of four locations 790TR, 790BR, 790TL, and 790BL, at a value of approximately eight pounds. The so-assembled device includes a preloaded springably mounted frame 710 aligned substantially parallel to the screen 721 of monitor 720. At rest, sensors 740 of assemblies 770 each experience substantially the same preload and therefore, any pressure on yoke 710 will register some differential pressure at sensors 740.

Referring now to the block diagram of FIG. 8, each of four sensors 740 (740TL, 740TR, 740BL, and 740BR) is preferably an analog resistive ink sensor with one lead "tied high" (connected to a 5 volt DC source), another lead connected to ground via a resister (R), and provides an input signal (via a different input channel) through A-to-D converter 860 to computer 870. Converter 860 can be an IBM PC fitted with a PC-LabCard model PCL 711 analog to digital card. The "PCL 711" card takes the unconditioned analog sensor signal from each sensor 740 as input and outputs a digital signal ("digitized sensor data") 880 to the IBM PC which then outputs digitized sensor data 880 via an RS232 port to computer image generating means 870, which can be a Silicon Graphics Crimson computer. Computer 870 is programmed with software 900 (described below) which enables it to generate control data which control the viewpoint of the virtual-world to be displayed by monitor 720.

Figure 9:
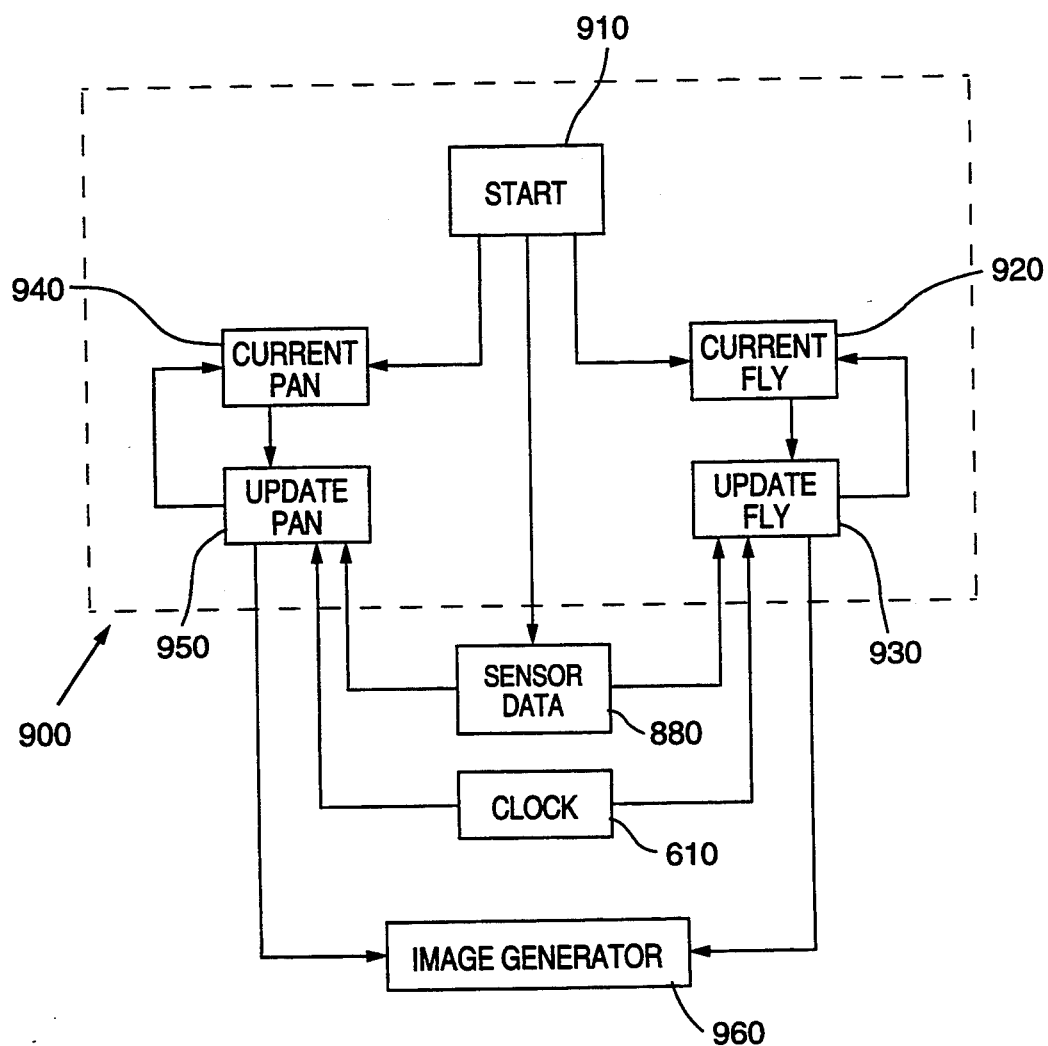
FIG. 9 is a flow chart of a portion (including software portion 900) of the second embodiment.
Figure 10:
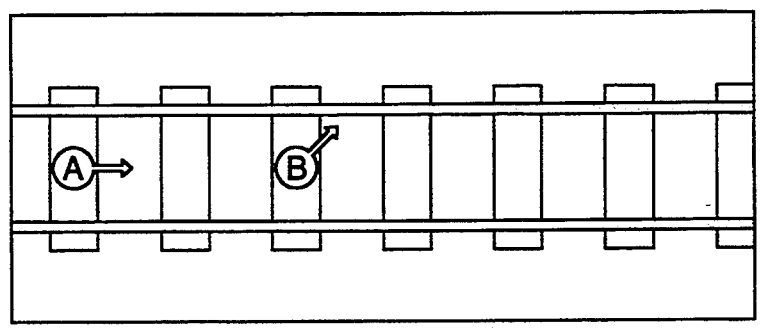
FIG. 10 is a schematic of two viewpoints as they relate to a section of railroad track.
Figure 11:
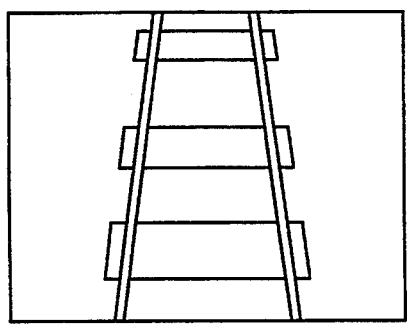
FIG. 11 is a view of a section of the railroad track of FIG. 10.
Figure 12:
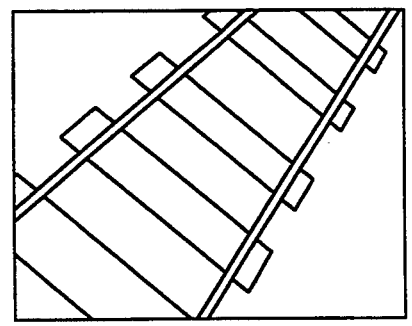
FIG. 12 is another view of a section of the railroad track of FIG. 10.

In accordance with standard programming practice and in particular, for programming Silicon Graphics computers according to the 1.1 IRIS Performer Release Notes manual, the following is a description of the computer software algorithm of software portion 900. Referring now to FIG. 9, software 900 has available inputs in the form of time from real-time clock 610 and digitized sensor values 880. Upon startup of a use session, initialization procedures 910 commence. Procedures 910 include the reading and storing of initial sensor values 880, and also the selecting and rendering of an associated initial virtual-view.

For notational convenience, sensor value 880TR (or "TR") denotes the digitized value of analog sensor 740TR, value 880TL (or "TL" denotes) the digitized value of analog sensor 740TL, and so forth. Accordingly, at startup 910, sensor value 880TRZ (or "TRZ") denotes the initial value of sensor 880TR and so forth for the other data values 880. The TRZ, TLZ, BRZ and BLZ sensor values are used throughout the session as the "zero" initial or starting data associated with an initial viewpoint from which all subsequent viewpoints are derived.

At clock pulses from clock 610, typically less than 20 milliseconds apart, digitized data 880 are read, and then a value for updated-pan-angle 950 is generated by incrementally updating the value of current-pan-angle 940 with a function of digitized sensor data 880 according to the following method:

updated 950 = current
$940 - k_1 * [k_3 * (cTR + cBR) - (cTL + cBL)] + k_2 * [k_2 * (cTR + cBR) - (cTL + cBL)]^3$ where cTR=TR−TRZ (i.e., cTR reflects the change in force on TR from its initial value TRZ,
cTL=TL−TLZ,
cBR=BR−BRZ,
cBL=BL−BLZ,
$k_2 = 0.00005$,
$k_2 = 3 \times 10^{-9}$ and,
$k_3 = 1.5$.

If the updated-pan value 950 is negative then the rotation is clockwise of the viewpoint at startup 910 and conversely, if it is positive, counterclockwise. It can be seen from the above description that the third order term has relatively small effect on updated-pan 950 when forces are relatively small but becomes the dominate term when larger forces are applied to sensors 740. The constants $k_1$, $k_2$ and $k_3$ have been empirically determined to give the best "feel" to the invention. Virtual-heading 950 is the pan or heading component of the updated viewpoint controlling the next re-draw of the virtual-view.

Next, with each clock cycle 610, the "flying" component 930 of the updated viewpoint (that is, the travel toward or away from the current-view) is calculated from the current sensor data 880 according to the following two-step method.

First, the relative force on the four sensors 740 is given by computing the value [cTL+cTR+cBR+cBL]. If the relative force on the four sensors 740 is greater than the startup value given by the sum [TLZ+TRZ+BRZ+BLZ], then the translation along the heading is "into" or "toward" the current-view and conversely, if the relative force is less then the startup value, the travel is "out" or "away" from the current-view.

Then secondly, a updated-flying value 930 is generated by incrementally updating the current-flying value 920 with a function of digitized sensor data 880 according to the following method:

Updated 930:=Current
920+[$K_4$*(cTL+cTR+cBR+cBL)+$K_5$*(cTL+cTR+cBR+cBL)$^3$]

where
$K_4 = 0.002$ and
$K_5 = 8 \times 10^{-6}$ for "in" (or $8 \times 10^{-8}$ for "out").

Using the new updated values for heading 950 and flying 930, an updated viewpoint is generated by image generating means 960 which is used to control the next re-draw of the virtual-scene. It can be seen that in this embodiment, constant force on sensors 740 yields constant rate of virtual-movement. It will be further understood that there is a non-linear change in rate of virtual-movement with change in force on sensors 740.

As can be seen from the two embodiments just presented, there are a number of methods of harnessing the natural body motion of the user's viewpoint orienting muscles and mapping that physical-movement to virtual-movement. In the first best mode, a small, binocular display itself is moved by the viewpoint orienting muscles (the display itself, and members rigidly attached thereto, function as a means for yoking the forces exerted by the viewpoint orienting muscles) and the scene is updated via output from a digital sensor. In the second case, a yoking means proximate to a standard computer monitor is manipulated by a user's viewpoint orienting muscles by which two degrees of freedom are controlled from the output of a set of analog sensors. There are many sensing means, number of degrees of freedom, monitor types and viewpoint orienting muscle yoking means which are included within the scope of the present invention.

Another embodiment of the invention will next be described with reference to FIG. 15. In this embodiment, the user's right hand grips right handle 1202 and the user's left hand grips left handle 1204. Handles 1202 and 1204 are rigidly attached to opposite sides of the upper portion of mount 1200. The lower portion of mount 1200 is attached to one end of left spring 1206, one end of right spring 1207, and one end of third spring 1212 (which is oriented perpendicularly to springs 1206 and 1207). The other ends of springs 1206, 1207, and 1208 are attached to force sensors 1210, 1211, and 1212, respectively. Sensors 1210–1212 are rigidly attached to housing 1205, so that output signals from the sensors are indicative of translation and/or rotation of handles 1202 and 1204 in any of multiple degrees of freedom (since such translation and/or rotation will cause springs 1206–1208 to exert different forces on sensors 1210–1212).

The output signals from sensors 1210–1212 are supplied to processor 1214, which controls the display of a virtual environment by a display device 1216. Processor 1214 is programmed with software for mapping these sensor output signals to the rate and direction of virtual-motion in the virtual environment displayed on display device 1216. The software maps physical-movements of the user to naturally corresponding virtual-movements, so that the user can manipulate his (or her) virtual area-of-interest as follows. If the user physically turns left (thereby rotating handles 1202 and 1204 counter-clockwise about a vertical axis), the visual presentation (by display device 1216) to the user will change correspondingly (the viewpoint in the virtual-world will pan to the left). Similarly, if the user physically turns right (thereby rotating handles 1202 and 1204 clockwise about the vertical axis), the viewpoint in the virtual-world will pan to the right.

In some embodiments of the invention, the means for yoking the user's viewpoint orienting muscle groups (e.g., frame 711, 712 of FIG. 5) is mounted symmetrically with respect to the display (e.g., so as to "frame" the display symmetrically with respect to an axis of symmetry of the display) and cannot be moved from such symmetrical position. In this case, the display device has an axis of symmetry (such as the vertical axis through the center of display screen 721 of FIG. 5), the yoking means is mounted so as to be constrained in a symmetrical position relative to this axis, and a human user can interface with (grip or wear) the yoke means with the user's body positioned symmetrically with respect both to the axis and the user's vertebral column (e.g., the user can sit with her vertebral column parallel to the axis, and trip the yoke means with left and right hands at points spaced substantially symmetrically to the left and right of the axis).

In contrast, in other embodiments (e.g., the FIG. 15 embodiment), the means for yoking the user's viewpoint orienting muscle groups (e.g., handles 1202 and 1204 of FIG. 15) is not mounted so that it always symmetrically frames the display. For example, in the FIG. 15 embodiment, the input device comprising components 1200–1212 can be attached to processor 1214 by long, flexible cables so that the user can move it as desired relative to display device 1216 (while the user always interfaces with the input device symmetrically with respect to the user's vertebral column, regardless of the position of the input device relative to the display device).

In the embodiment of FIG. 16, user 1130 grasps optics assembly 1120 and moves resistively against the assembly in a fashion similar to the other embodiments of this invention. Alternatively, optics assembly 1120 can be affixed to the user's head via a head strap. Assembly 1120 moves with respect to fixed display device 1100. The environment seen on the display device 1100 changes to give the user a feeling of virtual motion in a fashion similar to the other embodiments of this invention. The optics assembly can consist of magnifying lenses and prisms thus allowing the user to accommodate and converge on the virtual images in a more natural and comfortable fashion.

There a number of specific implementations of the present invention and there are advantages to each of them. For example, in the first implementation (described with reference to FIG. 1), the user tends to be especially immersed and to feel especially present in the virtual-world. In this implementation, user neck motion is naturally coupled to the change in area-of-interest and this sense of immersion is further enhanced by wide field stereoscopic images which completely subtend the field of view.

In variations on the first embodiment, handles 220 are replaced by (or supplemented with) a head strap, or other device for attaching to the user's head, neck, or upper body. By exerting muscular force (using viewpoint orienting muscle groups) on such a head strap (or other device), the user applies force or torque to sensor 140 (of FIG. 1) or one or more other force (or torque) sensors, and the output signals from the sensors are processed in software to map them to corresponding viewpoint changes in a virtual display (and corresponding virtual movements in virtual space).

The second embodiment (described with reference to FIG. 5) is easily adaptable to existing computer monitors and allows others to watch while the user works. This embodiment tends to keep the user's line of sight centered on the screen which aids any stereoscopic effect intended and generally increases the sense of connectedness and presence of the user to the virtual-world.

In general, the present invention requires very little desk space or user movement. The various implementations of the present invention are hygienic, and easily convertible between monoscopic and stereoscopic operation. Thus, the present invention provides methods of harnessing the natural motion of the human body to movement in a virtual-world but without requiring full physical-body motion to create the effect of full motion in the virtual-world which greatly reduces the user's need for physical-space and dexterity.

In some embodiments of the invention, both position sensors and force sensors are used with means for yoking (harnessing) a limited range of natural human body motions, and mapping the sensor outputs to movement in a virtual-world. For example, position sensor signals (indicative of translational or rotational displacement of the yoking means) can be mapped to corresponding virtual movement (translational or rotational) until the yoking means reaches the end of its range of motion. At this point, muscle exertion by the user will result in force application to one or more force sensors (mounted at the end of the range of motion), and the output signals of the force sensor(s) can be mapped to corresponding virtual movements (e.g., force sensor output signals indicative of torque with respect to a horizontal axis can map to viewpoint rotations about a horizontal axis in the virtual-world).

What is claimed is:

1. A system for controlling display of an image in response to muscle exertion by a user having a vertebral column, a left limb, a right limb, and viewpoint orienting muscles, said system comprising:

a non-head-mounted yoking means including a left member shaped and positioned for being gripped by the left limb during viewpoint orienting exertion of the viewpoint orienting muscles, and a right member shaped and positioned for being gripped by the right limb during viewpoint orienting exertion of the viewpoint orienting muscle, where the yoking means rotates about the vertebral column in response to said viewpoint orienting exertion of the viewpoint orienting muscles when the user's left limb grips the left member and the user's right limb grips the right member;

a sensing means, operably associated with the yoking means, for sensing at least one of a force and a displacement in response to rotational movement of the yoking means about the vertebral column in response to said viewpoint orienting exertion of the viewpoint orienting muscles with the left limb gripping the left member and the right limb gripping the right member, and for generating at least one sensor output signal indicating of each said force and each said displacement; and a control means, operably associated with the sensing means, for receiving each said sensor output signal and generating image control commands in response thereto, wherein the image control commands correspond to at least one of said force and said displacement and provide a nonlinear mapping of the rotational movement of the yoking means to change of the image, wherein said change of the image represents viewpoint rotation.

2. The system of claim 1, wherein the image control commands provide a nonlinear mapping of the rotational movement of the yoking means to at least one of a direction of movement of said image and a rate of movement of said image.

3. The system of claim 1, also including a display means for displaying the image in response to the image control commands.

4. The system of claim 3, wherein the yoking means includes:

a base: and a frame rotatably mounted to the base and rigidly attached to the display means, so that the frame and the display means are free to rotate together as a unit, through a limited angular range relative to the base, in response to said viewpoint orienting exertion of the viewpoint orienting muscles with the left limb gripping the left member and the right limb gripping the right member, wherein the frame includes said left member and said right member.

5. The system of claim 3, wherein the yoking means includes:

a frame mounted to the display means so that said frame has freedom to rotate, through a limited angular range relative to said display means, in response to said viewpoint orienting exertion of the viewpoint orienting muscles with the left limb gripping the left member and the right limb gripping the right member, wherein the frame includes said left member and said right member.

6. The system of claim 5, wherein the display means has a display screen having an outer periphery, and wherein the frame surrounds the outer periphery.

7. A system for displaying an image, including:
a display device having an axis of symmetry;
frame means, mounted to the display device symmetrically with respect to the axis, having human interface portions positioned symmetrically with respect to the axis;
sensor means for producing output signals, each of the output signals indicative of a force exerted on at least one of the human interface portions, said sensor means including at least one sensor mounted at an end of a limited range of motion of at least one of the frame means and the display device, wherein the sensor means produces first output signals in response to displacement of the frame means along the limited range of motion, and the sensor means produces second output signals in response to a force exerted on the frame means when said frame means is at the end of the limited range of motion; and
a computer, coupled to the sensor means, which receives the output signals.

8. The system of claim 7 wherein the computer is programmed with software for mapping the output signals to motions in a virtual environment.

9. The system of claim 7, where the frame means is fixedly attached to the display device, and the frame means and the display device move together as a unit through the limited range of motion relative to the sensor means.

10. The system of claim 9, also including:
a base supporting the sensor means, wherein the output signals are indicative of a force exerted on the base by one of the frame means and the display device.

11. The system of claim 10, wherein the output signals are also indicative of at least one of a linear displacement and a rotational displacement of said one of the frame means and the display device relative to the base.

12. The system of claim 9, wherein the human interface portions include a left handle dimensioned to be gripped by a left hand of a human user and a right handle dimensioned to be gripped by a right hand of the human user.

13. The system of claim 7, wherein the human interface portions frame the display device.

14. A system for displacing an image, including:
a disk, lay device having an axis of symmetry;
frame means, mounted to the display device symmetrically with respect to the axis, having human interface portions positioned symmetrically with respect to the axis;
sensor means for producing output signals, each of the output signals indicative of a force exerted on at least one of the human interface portions, said sensor means including at least one sensor mounted at an end of a limited range of motion of at least one of the frame means and the display device; and
a computer, coupled to the sensor means, which receives the output signals, wherein the frame means is mounted with freedom to move relative to the display device and the sensor means through the limited range of motion, and each of the output signals is indicative of at least one of a linear displacement of the frame means, a rotational displacement of the frame means, and a force on at least one of the human interface portions.

15. The system of claim 7, wherein the human interface portions include left end portion dimensioned for manipulation by a left hand of a human user and a right end portion dimensioned for manipulation by a right hand of the human user.

16. The system of claim 7, wherein the axis is aligned with a human user's vertebral column, when the human user engages the frame means symmetrically with respect to said vertebral column.

17. The system of claim 7, wherein said image represents a virtual environment, and wherein the computer is programmed with software for displaying the image on the display device and for modifying the image in response to changes in the output signals.

18. The system of claim 17, wherein the image has a virtual axis corresponding to the axis of symmetry of the display device, and wherein the software maps force exerted on at least one of the human interface portions to one of translation and rotation of the image with respect to the virtual axis.

19. The system of claim 18, wherein the software also maps one of translation and rotation of the frame means in a first direction to one of translation and rotation of the image in said first direction with respect to the virtual axis.

20. A method for controlling display of an image in response to muscle exertion by a user, where the user has a vertebral column, a left limb, a right limb, and viewpoint orienting muscles, said method including the steps of:
rotating a non-head-mounted yoking means in a first direction about the vertebral column in response to viewpoint orienting exertion of the viewpoint orienting muscles, wherein the yoking means includes a left member that is gripped by the left limb during said viewpoint orienting exertion of the viewpoint orienting muscles, and a right member that is gripping the right limb during said viewpoint orienting exertion of the viewpoint orienting muscles;
sensing at least one of a force and a displacement in response to the rotational movement of the yoking means, and generating at least one sensor output signal indicative of each said force and each said displacement; and
generating at least one image control command in response to said at least one sensor output signal, wherein each said image control command corresponds to at least one of said force and said displacement and provides a mapping of the rotational movement of the yoking means to change of the image, wherein said change of the image represents viewpoint rotation in said first direction.

21. The method of claim 20, wherein the image control commands provide a nonlinear mapping of the rotational movement of the yoking means to at least one of a direction of movement of said image and a rate of movement of said image.

22. The method of claim 20, wherein the mapping is a nonlinear mapping.

23. A method of operating an image display system, said system including a display device having an axis of symmetry, including the steps of:
(a) exerting a force on at least one of two human interface portions of a yoke means, said yoke means being mounted to the display device symmetrically with respect to the axis of symmetry with the human interface portions positioned symmetrically with respect to the axis at an end of a limited range of motion of the yoke means;

(b) in response to step (a), producing an output, signal indicative of the force;

(c) supplying the output signal to a computer and processing said output signal in the computer; and (d) producing a second output signal in response to displacement of the yoke means along the limited range of motion, wherein the second output signal is indicative of at least one of a translational displacement and a rotational displacement of the human interface portions.

24. The method of claim 23, wherein step (c) includes the step of generating an image control signal from the output signal, where the image control signal is indicative of a change image viewpoint, and also including the steps of:

before completing step (c), displaying an image representing a virtual environment from a first viewpoint, on the display device; and after step (c), displaying on the display device a changed image representing the virtual environment form the changed viewpoint, in response to the image control signal.

* * * * *